United States Patent [19]
Sonobe et al.

[11] Patent Number: 5,616,436
[45] Date of Patent: Apr. 1, 1997

[54] CARBONACEOUS ELECTRODE MATERIAL FOR SECONDARY BATTERY AND PROCESS FOR PRODUCTION THEREOF

[75] Inventors: Naohiro Sonobe; Minoru Ishikawa; Takao Iwasaki, all of Iwaki, Japan

[73] Assignee: Kureha Kagaku Kogyo Kabushiki Kaisha, Tokyo, Japan

[21] Appl. No.: 518,306

[22] Filed: Aug. 23, 1995

[30] Foreign Application Priority Data

Aug. 23, 1995 [JP] Japan .................................. 6-219637

[51] Int. Cl.$^6$ .............. H01M 4/04; H01M 4/36; H01M 4/58
[52] U.S. Cl. .............. 429/218; 429/194; 429/197; 429/232; 423/421; 423/445 R
[58] Field of Search ................. 429/194, 197, 429/218, 232; 423/421, 445, 447.1, 447.9

[56] References Cited

U.S. PATENT DOCUMENTS

| | | | |
|---|---|---|---|
| 5,236,658 | 8/1993 | Takahashi et al. | 429/194 |
| 5,238,760 | 8/1993 | Takahashi et al. | 429/194 |
| 5,273,842 | 12/1993 | Yamahira et al. | 429/94 |
| 5,294,498 | 3/1994 | Omaru et al. | 429/122 |
| 5,308,599 | 5/1994 | Kawamara et al. | 423/447.4 |

OTHER PUBLICATIONS

Physical Chemistry, P.W. Atkins, 3rd Ed., W.H. Freeman Co., New York, (1986) Book Cover—Inside & p. 15.
Japanese Kokai, 60-100370, Jun. 4, 1985, Production Method of Porous Carbon Plastic Electrode, Yasuo Andou, et al.

*Primary Examiner*—Stephen Kalafut
*Assistant Examiner*—Richard H. Lilley, Jr.
*Attorney, Agent, or Firm*—Wenderoth, Lind & Ponack

[57] ABSTRACT

A carbonaceous electrode having improved capacities for doping and dedoping of a cell active substance, such as lithium, and suitable for a non-aqueous solvent-type secondary battery, is constituted by a carbonaceous material having a specific microtexture. The carbonaceous material is characterized by it's ability to provide an electrochemically lithium-doped product showing a main resonance peak which is shifted by 80–200 ppm to a lower magnetic field side from a resonance line of LiCl as a reference substance when subjected to $^7$Li-NMR spectroscopy analysis.

10 Claims, 4 Drawing Sheets

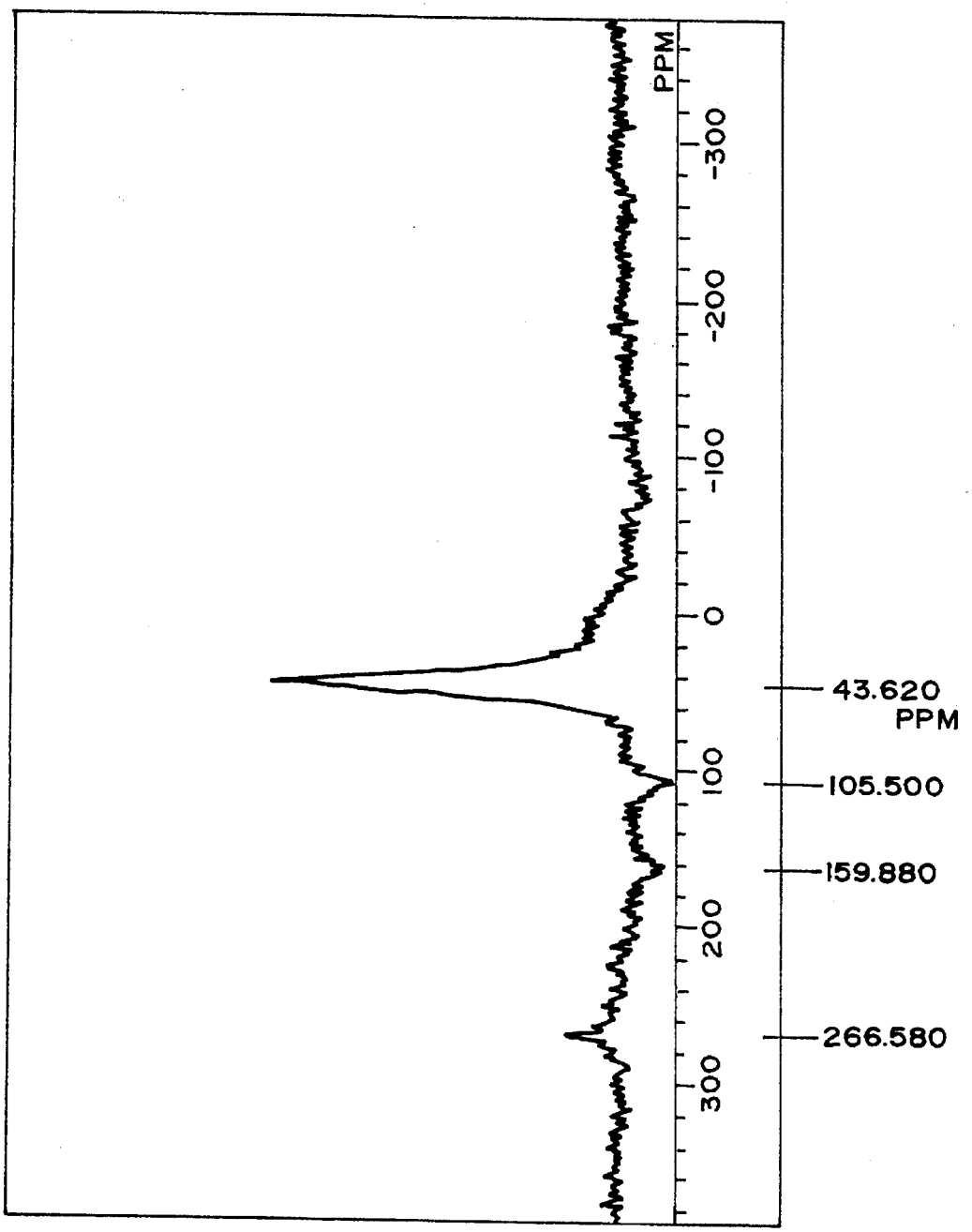

CARBONACEOUS ELECTRODE MATERIAL FOR SECONDARY BATTERY AND PROCESS FOR PRODUCTION THEREOF

FIELD OF THE INVENTION AND RELATED ART

The present invention relates to a carbonaceous electrode material for a secondary battery, more particularly a carbonaceous material suitable as an electrode material for a high-energy density non-aqueous solvent-type secondary battery, and a process for production thereof. The present invention also relates to an electrode structure comprising such a carbonaceous electrode material, and a non-aqueous solvent-type secondary battery having such an electrode structure.

Accompanying the development of, e.g., video tape recorders and small-sized communication appliances reduced in size and weight, there has been an increasing demand for a secondary battery of a high energy density as a power supply for such appliances, and non-aqueous solvent-type lithium secondary batteries have been proposed therefor (e.g., Japanese Laid-Open Patent Application (JP-A) 57-208079, JP-A 62-90863, JP-A 62-122066 and JP-A 2-66856). These batteries use a negative electrode comprising a carbonaceous material doped with lithium instead of an electrode of lithium metal so as to alleviate the danger of internal short circuit due to occurrence of dendrite and improve the charge-discharge characteristic, storage stability, etc.

In order to produce a battery of a high energy density, it is important that the carbonaceous material constituting the negative electrode can be doped and de-doped with a large amount of lithium.

In the above-mentioned prior proposals, it has been proposed to use graphite or a carbonaceous material obtained by carbonizing an organic material as a negative electrode material for non-aqueous solvent-type lithium secondary batteries.

When graphite is doped with lithium, a graphite intercalation compound is formed. In this instance, a graphitic material having a larger crystallite size in its c-axis direction is liable to receive a larger strain acting on the crystallites at the time of repetition of doping-dedoping, thus being liable to break the crystalline structure. Accordingly, a secondary battery prepared by using graphite or a carbonaceous material having a developed graphite structure represented by a large crystallite size in the c-axis direction is liable to have an inferior charge-discharge repetition performance. Further, in order to prevent the decomposition of an electrolytic solution, it is required to use an ethylene carbonate-based electrolytic solution. However, ethylene carbonate has a high melting point and accordingly a secondary battery using the ethylene carbonate-based electrolytic solution shows an inferior performance at low temperatures. Incidentally, doping and de-doping of lithium between graphite layers are caused to proceed from edge surfaces of graphite but in graphite crystallite having a large crystallite size in a-axis direction, the edge surfaces are little, so that the doping and dedoping become slow. Accordingly, when rapid charging or discharging is performed in a battery using such a carbonaceous material having a developed graphite structure, difficulties are encountered which result in an abrupt decrease in the doping or dedoping capacity or require a high overvoltage, which can decompose the electrolytic solution.

On the other hand, polyacene obtained by heat-treating phenolic resin at around 800° C. and low-temperature treated carbon obtained by heat-treating mesocarbon microbeads (MCMB) at around 800° C. have a high doping capacity as high as 700–1000 mAh/g but they have been reported to have a de-doping capacity of ca. 500–600 mAh/g resulting in a large irreversible capacity (difference between the doping and de-doping capacities) of 200 mAh/g or higher, so that lithium having doped a negative electrode carbon is not completely released but the lithium as an active substance is wasted (see, e.g., SEVENTH INTERNATIONAL MEETING ON LITHIUM BATTERIES, Boston, Mass., U.S.A., May 15–20, 1994, EXTENDED ABSTRACTS AND PROGRAM, page 212-).

SUMMARY OF THE INVENTION

An object of the present invention is to provide a carbonaceous electrode material for a secondary battery capable of providing a non-aqueous solvent-type secondary battery having large charge and discharge capacity, a high active substance-utilization rate and an excellent charge-discharge cycle characteristic.

A more specific object of the present invention is to provide a carbonaceous material for a non-aqueous solvent-type secondary battery having large capacities for doping and de-doping of an active substance, such as lithium, providing a smaller amount of active substance remaining in the carbonaceous material without de-doping (i.e., a smaller irreversible capacity) and being less liable to cause structural breakage of carbonaceous material or decomposition of the electrolytic solution even on repetition of charge-discharge cycles.

A further object of the present invention is to provide a process for producing such a carbonaceous material as described above, an electrode structure by using such a carbonaceous material, and also a non-aqueous solvent-type secondary battery including such an electrode structure.

According to our study, it has been found possible to provide a carbonaceous material capable of storing a large amount of active substance, such as lithium, thus providing a large charge-discharge capacity, causing little decrease in capacity in rapid charging-discharging, having excellent charge-discharge cycle characteristic and having little irreversible capacity (large active substance utilization rate) by appropriately controlling the microtexture of the carbonaceous material.

More specifically, according to the present invention, there is provided a carbonaceous electrode material for a non-aqueous solvent-type secondary battery, comprising a carbonaceous material characterized by providing an electrochemically lithium-doped product showing a main resonance peak which is shifted by 80–200 ppm to a lower magnetic field side from a resonance line of LiCl as a reference substance when subjected to $^7$Li-NMR spectroscopy analysis.

Hereinafter, such a shift of a resonance peak toward a lower magnetic field side from a resonance line of LiCl as a reference substance is called a "Knight shift".

Such a carbonaceous material having the above-mentioned property may be produced, e.g., through a process comprising the steps of:

crosslinking a tar or pitch of a petroleum or coal origin, and carbonizing the crosslinked tar or pitch at a temperature of 900°–1500° C. under a reduced pressure of at most 10 kPa (0.1 atm).

The thus-produced carbonaceous material according to the present invention may provide an increased doping-dedoping capacity (ca. 500–650 mAh/g, in term of an electricity per unit mass, as will be shown in Examples appearing hereinafter). This is understood to mean that the carbonaceous material having an appropriately controlled microtexture according to the present invention allows a lithium storage mechanism, as a dominating one, corresponding to a Knight shift of 80–200 ppm, which is different from either of a hitherto reported lithium storage mechanism accompanied with formation of lithium-graphite intercalation compound $LiC_6$ (providing a capacity of 372 mAh/g at the maximum and corresponding to a Knight shift of ca. 44 ppm or below) and precipitation of metallic lithium (corresponding to a Knight shift of ca. 265 ppm).

According to another aspect of the present invention, there is provided an electrode structure for a non-aqueous solvent-type secondary battery, comprising: an electroconductive substrate and a composite electrode layer disposed on at least one surface of the electroconductive substrate; the composite electrode layer comprising a carbonaceous electrode material as described above in a particulate form, and a binder.

According to a further aspect of the present invention, there is provided a non-aqueous solvent-type secondary battery, comprising, a positive electrode, a negative electrode, and a separator and a non-aqueous electrolytic solution disposed between the positive and negative electrodes; at least one of the positive and negative electrodes comprising an electrode structure as described above.

These and other objects, features and advantages of the present invention will become more apparent upon a consideration of the following description of the preferred embodiments of the present invention taken in conjunction with the accompanying drawings.

BRIEF DESCRIPTION OF THE DRAWING

FIG. 5 is a $^7Li$-NMR spectrum of natural graphite used in Comparative Example 9 described hereinafter and doped with lithium in an amount corresponding to 600 mAh/g (graphite). In the figure, the side bands have been eliminated by the TOSS method.

DETAILED DESCRIPTION OF THE INVENTION

As described above, the carbonaceous material according to the present invention is characterized in that, when it is electrochemically doped with lithium, the doped product provides a $^7Li$-NMR spectrum including a main resonance peak which is shifted by 80–200 ppm to a lower magnetic field side from a resonance line of LiCl as a reference substance, i.e., providing a main resonance peak showing a Knight shift of 80–200 ppm.

Figure 3:
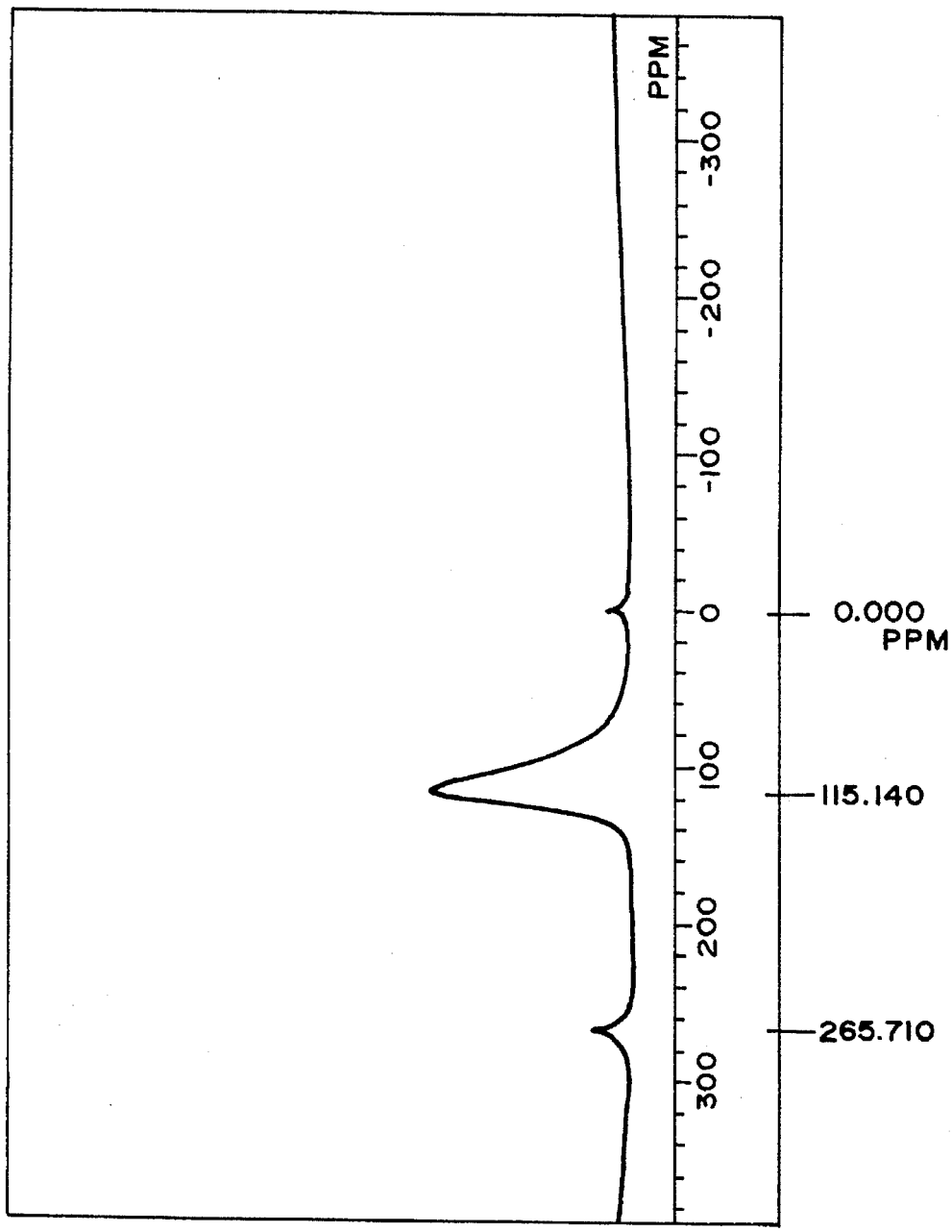
FIG. 3 is a $^7Li$-NMR spectrum of a carbonaceous material obtained in Example 1 described hereinafter and doped with lithium in an amount corresponding to 600 mAh/g (carbonaceous material).

When the carbonaceous material according to the present invention is doped with lithium, the lithium-doped product shows a Knight shift, which is attributable to lithium doping the carbonaceous material and increases as the lithium-doping amount increases, thereby providing a Knight shift exceeding 80 ppm. As the lithium-doping amount is further increased, in addition to a peak in the Knight shift range of 80–200 ppm, a peak attributable to metallic lithium appears at a Knight shift of ca. 265 ppm. This indicates that metallic lithium has been precipitated on the surface of the carbonaceous material (see, e.g., FIG. 3 showing a NMR spectrum of lithium-doped carbonaceous material of Example 1 appearing hereinafter).

Herein, a main resonance peak refers to a resonance peak providing the largest peak area in a lower magnetic field side range of 0–200 ppm.

Further, the expression of "showing a main resonance peak which is shifted by 80–200 ppm to a lower magnetic field side from a resonance line of LiCl as a reference substance" is intended to also cover the case where, even if a main resonance peak shows a Knight shift of below 80 ppm when the lithium-doping amount is small, the main resonance peak appears within the range of 80–200 ppm when the lithium-doping amount is increased, e.g., until metallic lithium is precipitated.

On the other hand, in case where natural graphite is doped with lithium until the occurrence of a peak at a Knight shift of ca. 265 ppm (attributable to metallic lithium), a peak attributable to lithium stored within the natural graphite does not show a Knight shift exceeding ca. 44 ppm (see FIG. 5 showing an NMR spectrum of lithium-doped natural graphite used in Comparative Example 9 appearing hereinafter).

Lithium doping graphite has been reported to be stored between graphite layers in the form of a so-called graphite intercalation compound and the maximum lithium-doping amount has been reported to be 372 mAh/g corresponding to $LiC_6$. This is believed to be corroborated by the fact that natural graphite does not provide a Knight shift exceeding ca. 44 ppm.

The fact that the carbonaceous material according to the present invention shows a Knight shift exceeding 80 ppm means that the carbonaceous material has an internal microtexture capable of storing lithium in a form other than the graphite intercalation compound. The main resonance peak of a lithium-doped carbonaceous material reflects a principal lithium-storage state in the carbonaceous material.

The carbonaceous material according to the present invention is characterized in that it can store a larger amount of lithium than graphite and provides a lithium-doped state showing an electrode potential which is relatively close to that given by metallic lithium. A lithium secondary battery including a negative electrode constituted by using such a carbonaceous material is advantageous in that it shows a large charge-discharge capacity and provides a high discharge potential. Further, such a battery also has a characteristic that the decomposition of an electrolytic solution at the time of charging and discharging can be obviated even if the electrolytic solution is formed by using propylene carbonate having a lower melting point than ethylene carbonate.

Figure 4:
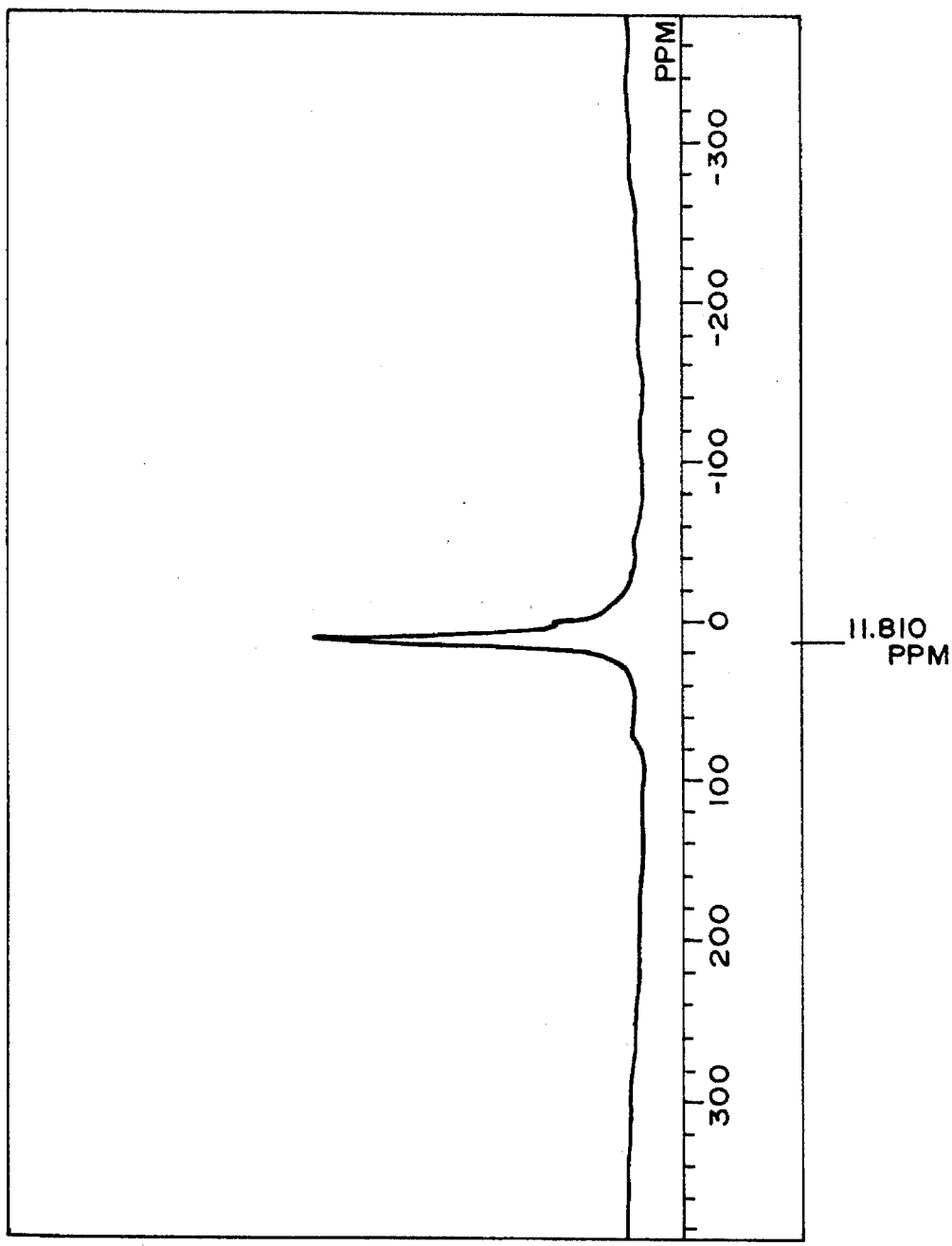
FIG. 4 is a $^7Li$-NMR spectrum of a carbonaceous material obtained in Comparative Example 4 described hereinafter and doped with lithium in an amount corresponding to 600 mAh/g (carbonaceous material).

In case of a carbonaceous material having a low degree of carbonization, e.g., a carbonaceous material obtained by carbonizing an organic material at a low temperature (e.g., 500°–800° C.), a main resonance peak may appear at a Knight shift of ca. 12 ppm (see FIG. 4 showing an NMR spectrum of lithium-doped carbonaceous material of Comparative Example 4 appearing hereinafter). A secondary battery including a negative electrode constituted by using such a carbonaceous material is accompanied with a difficulty that lithium doping the negative electrode carbon is not completely de-doped (liberated) to leave a large amount of lithium in the negative electrode carbon, thus wasting the lithium as the active substance.

Further, carbonaceous materials providing a main resonance peak at a Knight shift below 80 ppm, except for the above-mentioned carbonaceous material having a low carbonization degree, generally show a low capacity for doping with an active substance and are not preferred therefore. The carbonaceous material according to the present invention may preferably provide a main resonance peak at a Knight shift of at least 90 ppm, more preferably at least 95 ppm.

It is further preferred that the carbonaceous material according to the present invention shows a hydrogen/carbon atomic ratio H/C of at most 0.10 based on an elementary analysis thereof.

The atomic ratio H/C of hydrogen and carbon constituting a carbonaceous material is an index of carbonization degree of the carbonaceous material, and a lower H/C means a higher degree of carbonization.

A carbonaceous material having an H/C ratio exceeding 0.10 is insufficiently carbonized and is not preferred. In a secondary battery including a negative electrode constituted from such a carbonaceous material is liable to show a large irreversible capacity which is calculated as a difference between the doping capacity and de-doping capacity of an active substance, thus wasting the active substance. The H/C ratio may preferably be at most 0.08, further preferably at most 0.06.

The carbonaceous material according to the present invention may for example be produced through the following process.

That is, a tar or pitch of a petroleum or coal origin is crosslinked to form a carbon precursor, and the carbon precursor is carbonized at 900°–1500° C. under a reduced pressure of at most 10 kPa. The crosslinking of a pitch or tar is performed in order to provide a nongraphitizable carbonaceous material after the carbonization of the crosslinked pitch or tar.

Examples of the tar or pitch as a starting material of the carbonaceous material according to the present invention may include petroleum-type tar or pitch which is produced as a by-product in the production of ethylene, coal tar produced by the dry distillation of coal, heavy fractions, or pitch obtained from coal tar by removing low-boiling fractions by distillation, and tar or pitch obtained by liquefaction of coal. These tars or pitches can be used in mixture of two or more species.

The crosslinking of the tar or pitch may be effected by using a crosslinking agent or by treatment with an oxidizing agent, such as oxygen.

In the case of using a crosslinking agent, the crosslinking agent may be added to the tar or pitch and mixed under heating to cause the crosslinking, thereby obtaining a carbon precursor.

Examples of the crosslinking agent may include polyfunctional vinyl monomers, such as divinylbenzene, trivinylbenzene, diallyl phthalate, ethylene glycol dimethacrylate, and N,N-methylene-bisacrylamide, which cause crosslinking through a radical reaction. The crosslinking using such a polyfunctional vinyl monomer may be initiated by adding a radical initiator, examples of which may include: α,α'-azobisisobutyronitrile (AIBN), benzoyl peroxide (BPO), lauroyl peroxide, cumene hydroperoxide, dicumyl peroxide, t-butyl hydroperoxide, and hydrogen peroxide.

Further, in the case of crosslinking by using an oxidizing agent, such as air, it is preferred to obtain a carbon precursor through a process as follows.

That is, a pitch, such as petroleum pitch or coal pitch, is mixed under heating with an additive comprising an aromatic compound of two or three aromatic rings having a boiling point of at least 200° C. or a mixture of such aromatic compounds, and the mixture is then shaped to provide a shaped pitch product. Then, the additive is removed from the shaped pitch product by extraction with a solvent having a low dissolving power to the pitch and a higher dissolving power to the additive, to leave a porous pitch product, which is then oxidized to provide a carbon precursor.

Removal of the additive from the shaped pitch product by extraction converts the shaped product into a porous body, thereby facilitating the crosslinking treatment by oxidation and also is effective for providing a porous carbonaceous material after the carbonization. The additive may for example comprise one or a mixture of two or more species selected from naphthalene, methylnaphthalene, phenylnaphthalene, benzylnaphthalene, methylanthracene, phenanthrene and biphenyl. The addition amount thereof may preferably be in the range of 30–70 wt. parts per 100 wt. parts of the pitch.

The mixing of the pitch and the additive may be performed in a molten state under heating in order to accomplish uniform mixing. The mixture of the pitch and the additive may preferably be shaped into particles having a size of 1 mm or smaller. The shaping may be performed in a molten state or, e.g., by pulverization, after cooling.

Suitable examples of the solvent for removing the additive from the mixture of the pitch and the additive may include: aliphatic hydrocarbons, such as butane, pentane, hexane and heptane; mixtures comprising principally aliphatic hydrocarbons, such as naphtha and kerosene; and aliphatic alcohols, such as methanol, ethanol, propanol and butanol.

By extracting the additive from the shaped mixture product with such a solvent, it is possible to remove the additive from the shaped product while retaining the shape of the product. At this time, it is assumed that pores are formed at sites from which the additive is removed, thereby providing a uniformly porous pitch product.

The thus-obtained porous pitch product is then subjected to oxidation with an oxidizing agent at a temperature of preferably 50°–400° C. Examples of the oxidizing agent may include: oxidizing gases, such as $O_2$, $O_3$, $SO_3$, $NO_2$, mixture gases formed by diluting these gases with, e.g., air or nitrogen, and air; and oxidizing liquids, such as sulfuric acid, nitric acid, and hydrogen peroxide aqueous solution.

As the oxidizing agent, it is convenient and economically advantageous to use an oxygen-containing gas, such as air and a gaseous mixture of air and another gas such as a combustion gas, for the crosslinking treatment at 120°–300° C. In this instance, the pitch may preferably have a softening point of at least 150° C. since a pitch having a lower softening points is liable to be melted during oxidation, thus making the oxidation difficult.

The thus-crosslinked carbon precursor may be carbonized at 900°–1500° C. under a reduced pressure of at most 10 kPa.

Alternatively, the carbonaceous material according to the present invention may also be produced by carbonizing a plant fiber material, such as coconut shell, at 900°–1500° C. under a reduced pressure of at most 10 kPa. In this case, it is preferred to remove inorganic substance contained in coconut shell, etc., by treatment with an acid, such as hydrochloric acid, before the carbonization. Coconut shell char obtained by calcining coconut shell at low temperatures is a preferable starting material (carbon precursor).

In order to prevent the oxidation of a carbon precursor, the carbonization may preferably be performed in a reduced pressure atmosphere which is allowed to contain an inert gas such as nitrogen or argon in the case of a low degree of pressure reduction. In case where the reduced pressure exceeds 10 kPa or in case where the carbonization temperature is below 900° C. or above 1500° C., it is difficult to obtain a carbonaceous material capable of providing a lithium-doped product showing a Knight shift of 80–200 ppm when subjected to $^7$Li-NMR spectroscopy analysis. The pressure may preferably be at most 1 kPa, further preferably at most 0.1 kPa. The carbonization temperature may preferably be 950°–1450° C., further preferably 1000°–1400° C.

The carbonization under a reduced pressure can be performed through the whole carbonization step, but it is sufficient that only the carbonization in a temperature region of 800°–1500° C. is performed under a reduced pressure.

Figure 1:
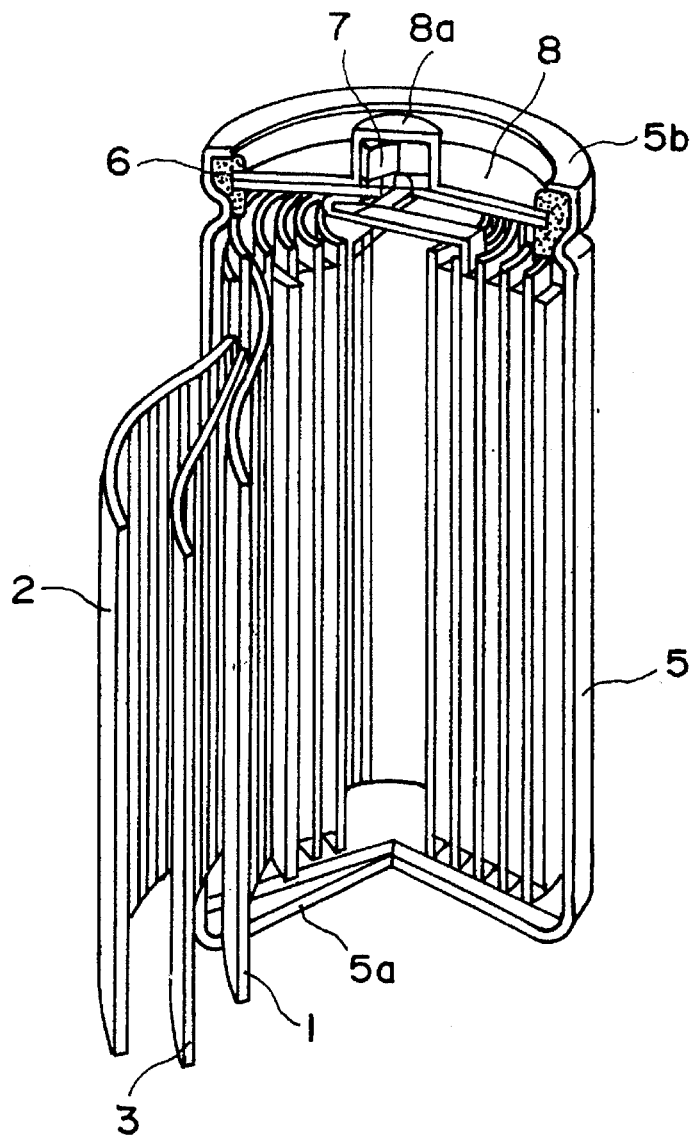
FIG. 1 is a partially exploded perspective view of a non-aqueous solvent-type secondary battery which can be constituted according to the invention.

FIG. 1 is a partially exploded perspective view of a lithium secondary battery as an embodiment of a non-aqueous solvent-type secondary battery according to the present invention.

More specifically, the secondary battery basically includes a laminate structure including a positive electrode 1, a negative electrode 2 and a separator 3 disposed between the positive and negative electrodes 1 and 2 and comprising a fine porous film of a polymeric material, such as polyethylene or polypropylene, impregnated with an electrolytic solution. The laminate structure is wound in a vortex shape to form an electricity-generating element which is housed within a metal casing 5 having a bottom constituting a negative electrode terminal 5a. In the secondary battery, the negative electrode 2 is electrically connected to the negative electrode terminal 5a, and the uppermost portion of the battery is constituted by disposing a gasket 6 and a safety valve 7 covered with a top plate 8 having a projection constituting a positive electrode terminal 8a electrically connected to the positive electrode. Further, the uppermost rim 5b of the casing 5 is crimped toward the inner side to form an entirely sealed cell structure enclosing the electricity-generating element.

Figure 2:
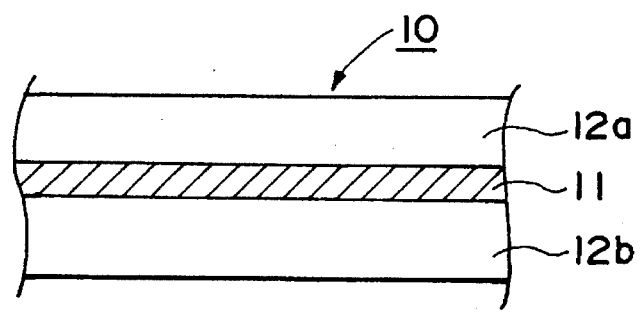
FIG. 2 is a partial sectional view of an electrode structure adopted in the secondary battery.

Herein, the positive electrode 1 or negative electrode 2 may be constituted by an electrode structure 10 having a sectional structure as partially shown in FIG. 2. More specifically, the electrode structure 10 includes an electroconductive substrate 11 comprising a foil or wire net of a metal, such as iron, stainless steel, steel, aluminum, nickel or titanium and having a thickness of, e.g., 5–100 μm, or 5–20 μm for a small-sized battery, and a composite electrode layer (12a, 12b) of, e.g., 10–1000 μm, preferably 10–200 μm, in thickness for a small-sized battery, on at least one surface, preferably on both surfaces as shown in FIG. 2, of the electroconductive substrate 11.

The composite electrode layers 12a and 12b are respectively a layer comprising a particulate carbonaceous material according to the present invention, an electroconductive material such as electroconductive carbon, optionally included, and a binder such as a vinylidene fluoride resin.

More specifically, in case of using the carbonaceous material according to the present invention for producing an electrode 10 (1 or 2) of a non-aqueous solvent-type secondary battery as described above, the carbonaceous material may be optionally formed into fine particles having an average particle size of 5–100 μm and then mixed with a binder stable against a non-aqueous solvent, such as polyvinylidene fluoride, polytetrafluoroethylene or polyethylene, to be applied onto an electroconductive substrate 11, such as a circular or rectangular metal plate, to form, e.g., a 10–200 thick layer. The binder may preferably be added in a proportion of 1–20 wt. % of the carbonaceous material. If the amount of the binder is excessive, the resultant electrode is liable to have too large an electric resistance and provide the battery with a large internal resistance. On the other hand, if the amount of the binder is too small, the adhesion of the carbonaceous material particles with each other and with the electroconductive substrate is liable to be insufficient. The conversion of carbonaceous material into particles can also be performed at an intermediate stage of the carbonaceous material formation, such as before carbonization of the infusibilized pitch shaped body or after the preliminary carbonization. The above described formulation and values have been set forth with respect to production of a secondary battery of a relatively small capacity, whereas, for production of a secondary battery of a larger capacity, it is also possible to form the above-mentioned mixture of the carbonaceous material fine particles and the binder into a thicker shaped product, e.g., by press-forming, and electrically connect the shaped product to the electroconductive substrate.

The carbonaceous material of the present invention can also be used as a positive electrode material for a non-aqueous solvent-type secondary battery by utilizing its good doping characteristic but may preferably be used as a negative electrode material of a non-aqueous solvent-type secondary battery, particularly for constituting a negative electrode to be doped with lithium as an active substance of a lithium secondary battery.

In the latter case, the positive electrode material may comprise a complex metal chalcogenide, particularly a complex metal oxide, such as $LiCoO_2$, $LiNiO_2$ or $LiMnO_4$. Such a positive electrode material may be formed alone or in combination with an appropriate binder into a layer on an electroconductive substrate.

The non-aqueous solvent-type electrolytic solution used in combination with the positive electrode and the negative electrode described above may generally be formed by dissolving an electrolyte in a non-aqueous solvent. The non-aqueous solvent may comprise one or two or more species of organic solvents, such as propylene carbonate, ethylene carbonate, dimethyl carbonate, diethyl carbonate, dimethoxyethane, diethoxyethane, γ-butyrolactone, tetrahydrofuran, 2-methyl-tetrahydrofuran, sulfolane, and 1,3-dioxolane. Examples of the electrolyte may include $LiClO_4$, $LiPF_6$, $LiBF_4$, $LiCF_3SO_3$, $LiAsF_6$, LiCl, LiBr, $LiB(C_6H_5)_4$, and $LiN(SO_2CF_3)_2$.

As described above, a secondary battery of the present invention may generally be formed by disposing the above-formed positive electrode 1 and negative electrode 2 opposite to each other, optionally with a liquid-permeable separator 3 composed of, e.g., unwoven cloth or other porous materials, disposed therebetween, and dipping the positive and negative electrodes together with an intermediate permeable separator in an electrolytic solution as described above.

Incidentally, the measurement of hydrogen/carbon (H/C) atomic ratio, the $^7$Li-NMR spectroscopy and the measurement of pitch softening point referred to herein were performed in the following manner.

[Measurement of hydrogen/carbon (H/C) atomic ratio]

A sample of carbonaceous material was subjected to elementary analysis by using a CNH analyzer, and a hydrogen/carbon(H/C) atomic ratio was calculated as a ratio of numbers of atoms of hydrogen/carbon based on the weight proportions of hydrogen and carbon in the sample.

[$^7$Li-NMR analysis]

A non-aqueous solvent-type lithium secondary battery was constituted by using a positive electrode of a sample carbonaceous material and a lithium negative electrode prepared in a manner described hereinbelow, an electrolytic solution prepared by adding $LiPF_6$ at a rate of 1 mol/liter to a mixture solvent of diethyl carbonate and ethylene carbonate in a volume ratio of 1:1, and a separator of polypropylene-made porous membrane. Then, the carbonaceous material was doped with lithium by current conduction at a current density of 0.2 mA/cm$^2$ up to an electricity of 600 mAh/g.

After the doping, a pause period of 2 hours was placed, and the carbonaceous positive electrode was taken out in an argon gas atmosphere. After wiping off the electrolytic solution, the whole carbonaceous positive electrode was placed in an NMR measurement sample tube. The sample was subjected to MAS-$^7$Li-NMR spectroscopy by using an apparatus therefor ("JNM-EX270" available from Nihon Denshi K.K.) while using LiCl as the reference substance set to 0 ppm.—Preparation of positive electrode (carbonaceous material) and negative electrode (Li).

90 wt. parts of a powdery carbonaceous material and 10 wt. parts of polyvinylidene fluoride were mixed with N-methyl-2-pyrrolidone to form a paste composite, which was then applied onto a copper foil. The composite was dried, peeled off from the copper foil and then stamped into a 21 mm-dia. disk, which was then press-bonded onto a 21 mm-dia. disk-shaped net of stainless steel to form a positive electrode containing ca. 40 mg of the carbonaceous material. On the other hand, a negative electrode was prepared by stamping a 1 mm-thick metallic lithium plate into a 21 mm-dia. disk.

[Softening point]

The softening point of a sample pitch was measured by placing 1 g of a sample pulverized into particles of at most 250 μm in a cylinder having a sectional area of 1 cm$^2$ and equipped with a 1 mm-dia. nozzle at its bottom, and the sample was heated at a rate of 6° C./min. under a load of 9.8 N/cm$^2$ (=10 kg/cm$^2$). As the temperature increased, the sample particles are softened to provide an increased packing rate, thus showing a volume decrease, which however ceased at or above a certain temperature. On further temperature increase, the sample melted and started to flow through the nozzle at the cylinder bottom. The temperature at which the volume decrease of the sample ceases was defined as the softening point of the sample. Incidentally, a sample having a high softening point can fail to flow through the nozzle.

Hereinbelow, the present invention will be described more specifically with reference to Examples and Comparative Examples.

EXAMPLE 1

68 kg of a petroleum pitch having a softening temperature of 210° C., a quinoline-insoluble content of 1 wt. % and an H/C atomic ratio of 0.63, and 32 kg of naphthalene, were placed in a 300 liter-pressure-resistant vessel equipped with stirring blades, melt-mixed under heating at 190° C. and, after being cooled to 80°–90° C., extruded to form an about 500 μm-dia. string-shaped product. Then, the string-shaped product was broken so as to provide a diameter-to-length ratio of about 1.5, and the broken product was charged into an aqueous solution containing 0.53 wt. % of polyvinyl alcohol (saponification degree=88%) and heated to 93° C., followed by stirring for dispersion and cooling to form a slurry of pitch spheres. After removing a major part of water by filtration, the pitch spheres were subjected to extraction with about 6 times by weight of n-hexane to remove the naphthalene in the pitch spheres.

The thus-obtained porous spherical pitch was held at 260° C. for 1 hour while passing heated air to be oxidized into a thermally-infusible porous spherical oxidized pitch product. The resultant thermally infusible pitch was preliminarily carbonized at 600° C. for 1 hour in a nitrogen gas atmosphere (10$^2$ kPa) and then pulverized into carbon precursor particles of ca. 25 μm in average particle size. Then, the carbon precursor was carbonized at 1200° C. for 1 hour under a reduced pressure of $1.3 \times 10^{-5}$ kPa to obtain a carbonaceous material.

The properties of the thus-obtained carbonaceous material are shown in Table 1 appearing hereinafter, and a $^7$Li-NMR chart thereof is shown in FIG. 3.

EXAMPLE 2

A carbonaceous material was prepared in the same manner as in Example 1 except that the reduced pressure for the carbonization was changed to 4 kPa. The properties of the carbonaceous material are also shown in Table 1.

EXAMPLE 3

A carbonaceous material was prepared in the same manner as in Example 1 except that the carbonization temperature was changed to 1100° C. The properties of the carbonaceous material are also shown in Table 1.

EXAMPLE 4

200 g of petroleum tar having a softening point of 45° C. and an H/C ratio of 0.63 was placed in a 500 ml-separable flask and stirred in a molten state at 120° C. under a nitrogen stream, to which was added a mixture of 1 g of α,α'-azobisisobutyronitride (AIBN) dissolved in 70 g of divinylbenzene (DVB) (purity 57.2%), followed by 5 hours of reaction, to obtain a crosslinked pitch. The thus-obtained crosslinked pitch, after being cooled to room temperature, was pulverized into carbon precursor particles of ca. 20 μm in average particle size.

The carbon precursor particles were then carbonized at 1200° C. for 1 hour under a reduced pressure of $1.3 \times 10^{-5}$ kPa to obtain a carbonaceous material. The properties of the thus-obtained carbonaceous material are also shown in Table 1.

EXAMPLE 5

In a 300 ml-Erlenmeyer flask, 30 g of coconut shell char ("Yashibon No. 1", available from Kuraray Chemical K.K.) and 100 g of 35%-hydrochloric acid were placed and shaked at 50° C. for 1 hour, followed by filtration. The filtration residue was sufficiently washed with de-ionized water and dried at 120° C. for 2 hours to obtain de-ashed char. The resultant de-ashed char was pulverized into carbon precursor particles of ca. 20 μm in average size and then carbonized at 1200° C. for 1 hour under a reduced pressure of $1.3 \times 10^{-5}$ kPa to obtain a carbonaceous material. The properties of the carbonaceous material are also shown in Table 1.

COMPARATIVE EXAMPLE 1

A carbonaceous material was prepared in the same manner as in Example 1 except that the reduced pressure for the carbonization was changed to 40 kPa. The properties of the carbonaceous material are also shown in Table 1.

COMPARATIVE EXAMPLE 2

The carbon precursor particles described in Example 1 were placed in a furnace and the interior of the furnace was aerated with nitrogen gas. Then, the nitrogen introduction was terminated, and the carbon precursor particles were carbonized at 1100° C. for 1 hour in a self-generating gas atmosphere ($10^2$ kPa) to obtain a carbonaceous material. The properties of the carbonaceous material are also shown in Table 1.

COMPARATIVE EXAMPLE 3

The petroleum pitch described in Example 1 was preliminarily carbonized at 600° C. for 1 hour in a nitrogen gas atmosphere ($10^2$ kPa) and pulverized into carbon precursor particles of ca. 20 μm in average size.

The carbon precursor particles were carbonized at 1200° C. for 1 hour under a reduced pressure of $1.3 \times 10^{-5}$ kPa to obtain a carbonaceous material. The properties of the carbonaceous material are also shown in Table 1.

COMPARATIVE EXAMPLE 4

A carbonaceous material was prepared in the same manner as in Example 1 except that the carbonization temperature was changed to 800° C. The properties of the carbonaceous material are also shown in Table 1, and a $^7$Li-NMR chart thereof is shown in FIG. 4.

COMPARATIVE EXAMPLE 5

The carbonaceous material prepared in Example 1 was further heat-treated at 2400° C. in an argon gas atmosphere ($10^2$ kPa) to obtain a carbonaceous material. The properties of the carbonaceous material are also shown in Table 1.

COMPARATIVE EXAMPLE 6

A carbonaceous material was prepared in the same manner as in Example 1 except that the carbonization was performed at a temperature of 1400° C. under an argon gas stream (at $10^2$ kPa). The properties of the carbonaceous material are also shown in Table 1.

COMPARATIVE EXAMPLE 7

0.5 g of 85%-phosphoric acid and 10.0 g of water were added to 100 g of furfuryl alcohol, and the resultant mixture was subjected to 5 hours of reaction at 90° C., followed by gradual addition of 1N-NaOH aqueous solution to adjust the pH to ca. 5 and distilling-off of residual water and non-reacted alcohol to obtain a furfuryl alcohol pre-condensate, which was then cured at 150° C. for 16 hours to form a furan resin.

Further, the thus obtained furan resin was coarsely pulverized and pre-carbonized at 500° C. for 1 hour under a nitrogen gas stream (at $10^2$ kPa). The resultant carbon precursor was pulverized to an average size of ca. 20 μm and carbonized at 1100° C. for 1 hour under a nitrogen gas stream to obtain a carbonaceous material. The properties of the carbonaceous material are also shown in Table 1.

COMPARATIVE EXAMPLE 8

A mixture of 108 g of ortho-cresol, 32 g of paraformaldehyde, 242 g of ethyl cellosolve and 10 g of sulfuric acid was subjected to 3 hours of reaction at 115° C., followed by addition of 17 g of sodium carbonate and 30 g of water to neutralize the reaction liquid. The resultant reaction liquid was charged to 2 liter of water under stirring at a high speed to obtain a novolak resin. Then, 17.3 g of the novolak resin and 2.0 g of hexamethylenetetramine were kneaded at 120° C., and then heated at 250° C. for 2 hours to form a cured resin. The cured resin was coarsely pulverized, pre-calcined at 600° C. for 1 hour in a nitrogen gas atmosphere ($10^2$ kPa) and then heated at 1900° C. for 1 hour in an argon gas atmosphere ($10^2$ kPa) to obtain a carbonaceous material, which was further pulverized to an average particle size of 15 μm.

The properties of the carbonaceous material are also shown in Table 1.

COMPARATIVE EXAMPLE 9

Flaky natural graphite produced in Madagascar ("CP", available from Nippon Kokuen Shoji K.K.) was used for evaluation. The natural graphite had a fixed carbon content of 97%, ash of 2%, a volatile content of 1% and an average particle size of 7 μm.

The properties of the graphite are also shown in Table 1. The graphite also provided a $^7$Li-NMR chart as shown in FIG. 5 as a result of elimination of side bands according to the TOSS method.

The carbonaceous materials obtained in Examples and Comparative Examples were respectively used to prepare a non-aqueous solvent-type secondary battery (cell) and the performances thereof were evaluated in the following manner.

The carbonaceous material is generally suited for constituting a negative electrode of a non-aqueous solvent secondary battery. However, in order to accurately evaluate the performances of a carbonaceous material inclusive of a doping capacity (A) and a de-doping capacity (B) for a cell active substance and also an amount of the cell active substance remaining in the carbonaceous material without being dedoped ("irreversible capacity" (A-B)) without being affected by a fluctuation in performance of a counter electrode material, a large excess amount of lithium metal showing a stable performance was used as a negative electrode, and each carbonaceous material prepared above was used to constitute a positive electrode, thereby forming a lithium secondary battery, of which the performances were evaluated.

More specifically, the positive electrode was prepared as follows. That is, 9.0 wt. parts of the carbonaceous material thus formulated in the form of fine particles and 10 wt. parts of polyvinylidene fluoride were mixed together with N-methyl-2-pyrrolidone to form a paste composite, which was then applied uniformly onto a copper foil. The composite, after being dried, was peeled off the copper foil and stamped into a 21 mm-dia. disk. The disk was then press-bonded onto a 21 mm-dia. circular shaped net of stainless steel to form a positive electrode containing about 40 mg of the carbonaceous material. On the other hand, a negative electrode was prepared by stamping a 1 mm-thick sheet of lithium metal into a 21 mm-dia. disk.

The thus-prepared positive and negative electrodes were disposed opposite to each other with a porous polypropylene film as a separator disposed therebetween, and the resultant structure was dipped in an electrolytic solution comprising a 1:1 (by volume)-mixture solvent of propylene carbonate and dimethoxyethane and LiClO$_4$ dissolved therein at a rate of 1 mol/liter, thereby forming a non-aqueous solvent-type lithium secondary battery.

In the lithium secondary battery thus constituted, the carbonaceous material in the positive electrode was subjected to doping and dedoping of lithium to evaluate capacities therefor.

More specifically, the doping was effected by repeating a cycle including 1 hour of current conduction at a current density of 0.5 mA/cm$^2$ and 2 hours of pause until the equilibrium potential between the positive and negative electrodes reached 5 mV. The electricity thus flowed was divided by the weight of the carbonaceous material to provide a doping capacity (A) in terms of mAh/g. Then, in a similar manner, a current was flowed in a reverse direction to dedope the lithium from the doped carbonaceous material. The de-doping was effected by repeating a cycle including 1 hour of current conduction at a current density of 0.5 mA/cm$^2$ and 2 hours of pause, down to a cut-off voltage of 1.5 volts. The electricity thus flowed was divided by the weight of the carbonaceous material to provide a dedoping capacity (B) in terms of mAh/g. Then, an irreversible capacity (A-B) was calculated as a difference between the doping capacity (A) and the dedoping capacity (B), and a discharge efficiency (%) was obtained by dividing the dedoping capacity (B) with the doping capacity (A) and multiplying the quotient (B/A) with 100. The discharge efficiency is a measure of effective utilization of the active substance.

The performances of the lithium secondary batteries using positive electrodes of the respective carbonaceous materials measured in the above-described manner are summarized in the following Table 2.

In view of Table 2, it is understood that the secondary batteries prepared by using the carbonaceous materials according to Examples 1–6 of the present invention showed larger values in both doping capacity (A) and de-doping capacity (B) compared with the batteries prepared by using the carbonaceous materials of Comparative Examples 1–3 and 5–8. The secondary battery prepared by using the carbonaceous material of Comparative Example 4 showed a large irreversible capacity showing a large proportion of wasted lithium. This means that a larger amount of lithium has to be contained in the counterelectrode, and is of course disadvantageous.

On the other hand, the secondary battery prepared by using natural graphite of Comparative Example 9 caused decomposition of the electrolytic solution, thus failing to dope the graphite electrode with lithium. While it has been known that a secondary battery using a graphite electrode can be operated if an ethylene carbonate-based electrolytic solution is used, such a lithium secondary battery is accompanied with inferior cell performances at low temperature and is not desirable.

TABLE 1

Properties of carbonaceous materials

| Example & Comp. Example | Raw material | Carbonization temp. (°C.) | Pressure (kPa) | H/C | Knight shift (ppm) |
| --- | --- | --- | --- | --- | --- |
| Ex. | | | | | |
| 1 | Petro. pitch | 1200 | $1.3 \times 10^{-5}$ | 0.04 | 115 |
| 2 | " | 1200 | 4 | 0.04 | 93 |
| 3 | " | 1100 | $1.3 \times 10^{-5}$ | 0.05 | 99 |
| 4 | " | 1200 | $1.3 \times 10^{-5}$ | 0.05 | 103 |
| 5 | Coconut shell char | 1200 | $1.3 \times 10^{-5}$ | 0.06 | 105 |
| Comp. Ex. | | | | | |
| 1 | Petro. pitch | 1200 | 40 | 0.04 | 62 |
| 2 | " | 1100 | $10^2$ | 0.05 | 52 |
| 3 | " | 1200 | $1.3 \times 10^{-5}$ | 0.02 | 30 |
| 4 | " | 800 | $1.3 \times 10^{-5}$ | 0.12 | 10 |
| 5 | " | 2400 | $10^2$ | 0.01 | 26 |
| 6 | Coconut shell char | 1400 | $10^2$ | 0.03 | 30 |
| 7 | Furan resin | 1100 | $10^2$ | 0.05 | 75 |
| 8 | Phenolic resin | 1900 | $10^2$ | 0.04 | 28 |
| 9 | Natural graphite | — | — | — | 44 |

TABLE 2

Cell electrode performances of carbonaceous materials

| Example & Comp. Example | Raw material | Doping capacity (A) (mAh/g) | Dedoping capacity (B) (mAh/g) | Irreversible capacity (mAh/g) | Discharge efficiency (B/A) × 100 (%) |
| --- | --- | --- | --- | --- | --- |
| Example | | | | | |
| 1 | Petro. pitch | 605 | 499 | 106 | 82.5 |
| 2 | " | 530 | 425 | 105 | 80.2 |
| 3 | " | 646 | 515 | 131 | 79.7 |
| 4 | " | 617 | 495 | 122 | 80.2 |

TABLE 2-continued

| | | Cell electrode performances of carbonaceous materials | | | |
|---|---|---|---|---|---|
| Example & Comp. Example | Raw material | Doping capacity (A) (mAh/g) | Dedoping capacity (B) (mAh/g) | Irreversible capacity (mAh/g) | Discharge efficiency (B/A) × 100 (%) |
| 5 | Coconut shell char | 649 | 525 | 124 | 80.9 |
| Comp. Example | | | | | |
| 1 | Petro. pitch | 410 | 320 | 90 | 78 |
| 2 | " | 365 | 272 | 93 | 74.5 |
| 3 | " | 336 | 278 | 58 | 82.7 |
| 4 | " | 951 | 546 | 405 | 57.4 |
| 5 | " | 218 | 184 | 34 | 84.4 |
| 6 | Coconut shell char | 261 | 194 | 67 | 74.3 |
| 7 | Furan resin | 445 | 321 | 124 | 72.1 |
| 8 | Phenolic resin | 247 | 167 | 80 | 67.6 |
| 9 | Natural graphite | — | — | — | — |

As described above, the carbonaceous material according to the present invention has a microtexture allowing the storage of lithium as an active substance other than a form of lithium intercalation compound, thereby showing large doping and de-doping capacities and showing little irreversible capacity obtained as a difference between the doping and de-doping capacities.

Accordingly, by using the carbonaceous material as an electrode material, it is possible to provide a non-aqueous solvent-type secondary battery of a high energy density showing excellent performances.

What is claimed is:

1. A carbonaceous electrode material for a secondary battery, using a non-aqueous electrolyte solution comprising a carbonaceous material characterized by providing an electrochemically lithium-doped product showing a main resonance peak which is shifted by 80–200 ppm to a lower magnetic field side from a resonance line of LiCl as a reference substance when subjected to $^7$Li-NMR spectroscopy analysis.

2. A carbonaceous electrode material according to claim 1, wherein the carbonaceous material further shows a hydrogen/carbon ratio H/C of at most 0.10.

3. A carbonaceous electrode material according to claim 2, wherein the ratio H/C is at most 0.08.

4. A carbonaceous electrode material according to claim 1, wherein the main resonance peak is shifted by at least 90 ppm to a lower magnetic field side from the resonance line of LiCl.

5. A process for producing a carbonaceous electrode material for a secondary battery using a non-aqueous electrolytic solution, comprising the steps of:

crosslinking a tar or pitch of a petroleum or coal origin with a polyfunctional vinyl polymer in the presence of a radical initiator, and carbonizing the crosslinked tar or pitch at a temperature of 900°–1500° C. under a reduced pressure of at most 10 kPa, so as to provide a carbonaceous material characterized by providing an electrochemically lithium-doped product showing a main resonance peak which is shifted by 80–200 ppm to a lower magnetic field side from a resonance line of LiCl as a reference substance when subjected to $^7$Li-NMR spectroscopy.

6. A process for producing a carbonaceous electrode material for a secondary battery, using a non-aqueous electrolyte solution comprising:

carbonizing coconut shell at a temperature of 900°–1500° C. under a reduced pressure of at most 10 kPa, so as to provide a carbonaceous material characterized by providing an electrochemically lithium-doped product showing a main resonance peak which is shifted by 80–200 ppm to a lower magnetic field side from a resonance line of LiCl as a reference substance when subjected to $^7$Li-NMR spectroscopy.

7. An electrode structure for a secondary battery, using a non-aqueous electrolytic solution comprising: an electroconductive substrate and a composite electrode layer disposed on at least one surface of the electroconductive substrate;

said composite electrode layer comprising a carbonaceous electrode material according to any one of claims 1–4 in a particulate form, and a binder.

8. A secondary battery, using a non-aqueous electrolytic solution comprising, a positive electrode, a negative electrode, and a separator and a non-aqueous electrolytic solution disposed between the positive and negative electrodes;

at least one of said positive and negative electrodes comprising an electrode structure according to claim 7.

9. A secondary battery according to claim 8, wherein the electrode structure constitutes the negative electrode.

10. A process for producing a carbonaceous electrode material for a secondary battery, using a non-aqueous electrolyte solution comprising the steps of:

crosslinking a tar or pitch of a petroleum or coal origin, and carbonizing the crosslinked tar or pitch at a temperature of 900°–1500° C. under a reduced pressure of at most 10 kPa, so as to provide a carbonaceous material characterized by providing an electrochemically lithium-doped product showing a main resonance peak which is shifted by 80–200 ppm to a lower magnetic field side from a resonance line of LiCl as a reference substance when subjected to $^7$Li-NMR spectroscopy;

said crosslinking being carried out through the steps of:

mixing the pitch with an additive comprising an aromatic compound having two or three aromatic rings and a boiling point of at least 200° C. to form a shaped pitch product, extracting the additive from the shaped pitch product with a solvent showing a low dissolving power to the pitch and a high dissolving power to the additive, thereby leaving a porous pitch product, and oxidizing the porous pitch product.

* * * * *